Sept. 17, 1957 W. W. MEYER 2,806,720
SEAL
Filed Feb. 4, 1954

INVENTOR:—
WALTER W. MEYER
BY:—
Marzall, Johnston, Cook & Root
ATTORNEYS.

United States Patent Office 2,806,720
Patented Sept. 17, 1957

2,806,720

SEAL

Walter W. Meyer, Arlington Heights, Ill., assignor, by mesne assignments, to Muskegon Piston Ring Company, Muskegon, Mich., a corporation of Michigan Application February 4, 1954, Serial No. 408,127

1 Claim. (Cl. 286—11)

The present invention relates in general to shaft seals, and has more particular reference to the provision of improved means for sealing rotating shafts for the prevention of fluid leakage along the shaft, past a wall through which the shaft extends.

Seals of the sort herein contemplated may include a seal ring adapted to be mounted in position encircling the shaft to be sealed, said ring having an annular face formed for running engagement with a cooperating annular seat forming member, within which the shaft to be sealed may extend, the ring being sealed on the shaft and the annular seat forming member being mounted as on a wall through which the shaft turnably extends. The seal may include suitable gasket means of resilient material for sealingly mounting the ring on the shaft in yielding fashion; and spring means may be provided for normally urging the ring on the shaft in a direction to engage and form a running seal with the seat forming member, whereby fluid leakage along the surface of the shaft may be blocked by the gasket and the seal ring, while leakage between the ring and its cooperating seat forming member is prevented by the running engagement of the highly polished facing surfaces of the ring and the seat forming member.

In seals of the character mentioned, the gasket means may comprise resilient, rubber-like material adapted to frictionally fit upon and sealingly engage the shaft at a central sleeve-like shaft receiving gasket portion, the gasket having outwardly extending marginal portions adapted to sealingly engage the seal ring element, circumferentially thereof, whereby said gasket may seal against the passage of fluid along the shaft and through the ring.

An important object of the present invention is to provide an improved shaft seal of simplified construction and unusually efficient operating characteristics; a further object being to employ an exceedingly flexible gasket element in a seal of the character mentioned, whereby a relatively light inexpensive seal seating thrust spring may be employed in the seal assembly, thus minimizing seal wear; a further object being to utilize a sealing gasket of extreme flexibility in a seal assembly of the character mentioned.

Another important object is to provide a seal assembly of the character mentioned, embodying an annular trough-like gasket having inner and outer walls respectively adapted the one for sealing engagement on and around a shaft to be sealed, and the other to sealingly engage a cooperating seal ring element of the assembly, and ring thrusting spring means enclosed within the trough-like gasket; a further object being to form the inner wall of said gasket with a shoulder for seating one end of the thrust spring, whereby the opposite end of the spring may thrustingly engage the seal ring.

Another important object is to provide a seal assembly of the character mentioned, embodying an annular trough-like gasket having inner and outer walls respectively adapted the one for sealing engagement on and around a shaft to be sealed, and the other to sealingly engage a cooperating seal ring element of the assembly, wherein said inner and outer walls are formed with annular seats for receiving the opposite ends of a compression spring disposed within the trough-like gasket; a further object being to provide an annular sheet metal spring seating element in assembled position on the spring seats of the gasket to receive the pressure of the ring thrust spring.

Another important object is to provide a seal assembly of the character mentioned, embodying an annular trough-like gasket having inner and outer walls respectively adapted the one for sealing engagement on and around a shaft to be sealed, and the other to sealingly engage a cooperating seal ring element of the assembly, said outer wall being formed with an integral inwardly extending annular rib forming a seat for sealingly receiving the peripheral portions of the seal ring element, a compression spring within the trough-like gasket bearing at one end upon the annular rib to sealingly engage the same with the ring element, said spring bearing at its opposite end upon an annular seat formed on the inner wall of the trough-like gasket, to thereby impart spring thrust upon said ring in a direction axially away from said seat.

Another important object is to provide a seal assembly of the character mentioned including an annular trough-like gasket of resilient material, having concentric inner and outer walls, a ring assembled within the open side of said gasket and sealingly secured to the outer wall thereof, and a ring thrusting spring enclosed by said ring within said gasket and assembled therein under compression between said ring and a ring facing spring seat formed upon the inner annular wall of the gasket; a further object being to form said inner wall with a sleeve-like portion extending within and through said ring; a still further object being to form said sleeve-like portion and said ring with interfitting spline means to drivingly connect the seal ring on said sleeve portion.

The foregoing and numerous other important objects, advantages and inherent functions of the invention will become apparent as the same is more fully understood from the following description, which, taken in connection with the accompanying drawings, discloses preferred embodiments of the invention.

Referring to the drawings.

Figure 1:
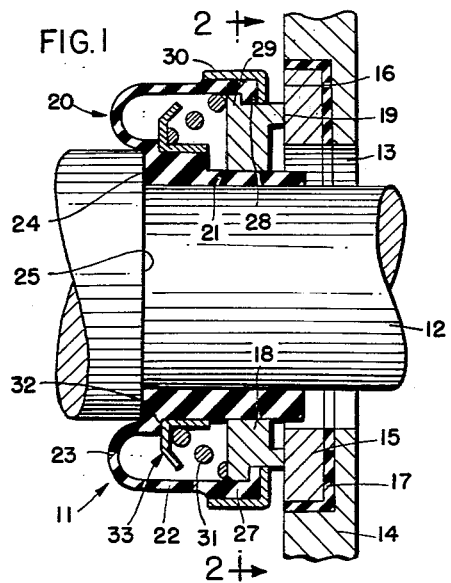
Fig. 1 is a sectional view through a shaft and seal assembly embodying the present invention.

To illustrate the invention, the drawings show a shaft seal assembly 11 adapted for use on a shaft 12, to seal the same against leakage along the shaft, as through an opening 13 in a wall member 14, through which the shaft extends. While the member 14 may comprise a stationary wall, in the opening 13 of which the shaft is turnably mounted, said member 14 may equally well comprise a structure which is mounted for rotation about the shaft 12.

The wall member 14, at the opening 13, may be provided with an annular member 15 forming a seal seat 16 encircling the opening 13. If desired, the member 15 may be formed as an integral part of the wall 14, or it may be formed as a separate collar or gland sealingly secured on the member 14, in the opening 13, as by means of suitable packing material 17.

The seal assembly 11 preferably comprises a seal ring 18 adapted to loosely encircle the shaft 12 and having an annular portion 19, on one side of the seal ring, adapted for running engagement with the seat 16. The mutually facing surfaces of the seat 16 and of the ring portion 19 are preferably ground to provide highly polished flat surfaces adapted to form a tight running seal, the one against the other. The seal ring 18 and the cooperating seat forming element 15 may comprise any suitable wearing or bearing materials, including metal, carbon, graphite, plastic and other synthetic materials, and ceramic material, although it is preferable to form one of the members of material which is softer than the other, so that one member may take optimal wear while the cooperating member may remain substantially unworn. The member comprising the relatively softer material may be made as a replaceable element; and, to that end, it is desirable to form the ring 18, and particularly the bearing portions 19 thereof, of material which is relatively softer than the material comprising the seat forming member 15, since it is ordinarily more expedient to supply the ring 18 as a replacement part. Accordingly, the seat forming member 15 may conveniently comprise steel or other relatively hard, long wearing material, while the ring 18, and particularly the bearing portions 19 thereof, may conveniently comprise bronze or other suitable bearing material adapted for sealing engagement with the seat 16.

The seal structure includes a gasket element 20 of resilient rubber-like material, such as neoprene, synthetic rubber, or other resilient and flexible gasket material. The gasket 20 is preferably formed as an annular diaphragm of generally trough-like configuration in radial section, providing concentrically disposed inner and outer wall portions 21 and 22 interconnected by a relatively thin and flexible connecting portion 23 forming the bottom of the trough-like gasket. The inner wall portion 21 of the diaphragm comprises a sleeve sized to snugly fit around and sealingly engage upon the surfaces of the shaft 12 on which the seal structure is assembled. The sleeve-like wall portion 21, at the end thereof which is connected with the flexible connecting portion 23, may provide an annular seat 24 in position to engage a facing shoulder 25 formed on the shaft. At its end remote from the seat 24, the sleeve-like wall 21 may be sized to extend within the central shaft receiving opening of the seal ring 18; and the ring 18 and the portions of the sleeve-like wall 21 which extend within the ring may be formed with spline means comprising grooves 25 and lands 26 formed in the seal ring 18, and cooperating lugs 25′ and intervening grooves 26′ formed in the sleeve-like wall portion 21 for interfitting engagement with the grooves and lands of the seal ring, as clearly shown in Figs. 2 and 5 of the drawings. The outer wall portion 22 of the gasket, at one end thereof, is preferably integrally connected with the connecting portion 23.

Figure 2:
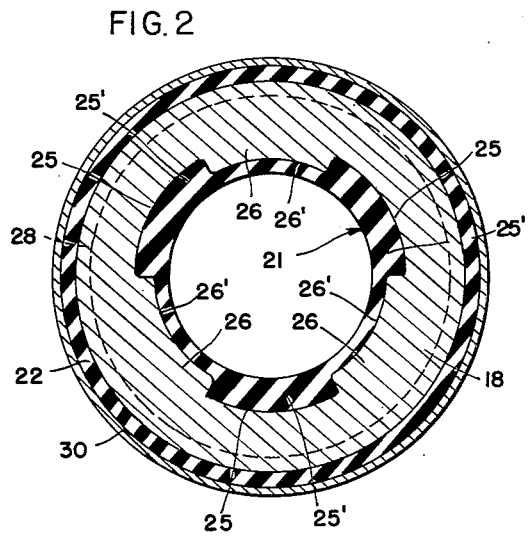
Fig. 2 is a sectional view taken substantially along the line 2—2 in Fig. 1.
Figure 3:
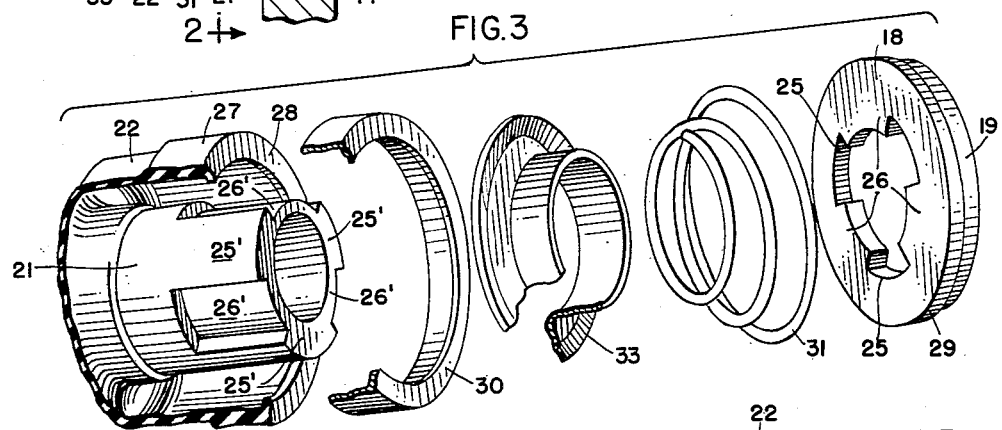
Fig. 3 is an exploded view of parts of the seal assembly, shown in perspective.

At its opposite end, remote from the connecting portion, the outer wall portion 22, as shown more particularly in Figs. 1–3 of the drawings, may be thickened to form a rim 27 having an in-turned terminal flange 28 formed at the edge of said outer wall portion remote from the flexible connecting portion 23 for interfitting engagement with an outstanding peripheral rib 29 formed on the seal ring 18. A formed sheet metal retaining shell 30 may be applied upon the thickened rim portion 27 in order to sealingly clamp said rim portion to the peripheral rib 29 of the seal ring, said retaining shell 30 having an annular in-turned flange portion adapted to overlie the in-turned flange 28 of the gasket and hold the same against the rib 29. As shown more particularly in Figs. 4 and 5, the outer wall portion 22 may be of uniform thickness from its junction with the connecting portion 23 to the end thereof remote from said connecting portion, and a sleeve-like retaining shell 30′ may be mounted in position snugly embracing said outer wall portion 22 to hold the same in tight sealing engagement with the periphery of the seal ring 18. In the embodiment illustrated in Figs. 4 and 5, the outer wall 22 of the gasket is formed with an inwardly extending annular rib 28′ spaced inwardly of the end edge of the wall portion 22, in position to engage the side of the seal ring which faces away from the sealing rib 19.

Figure 4:
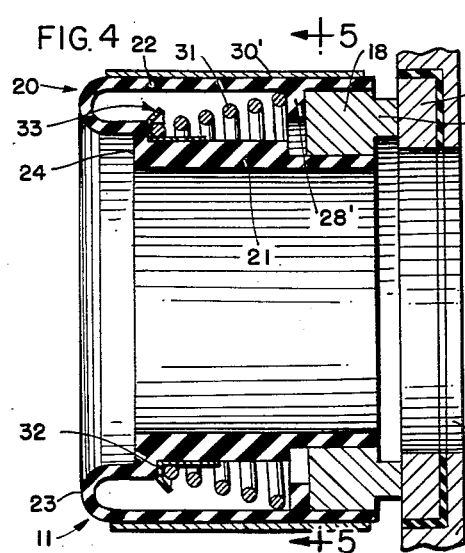
Fig. 4 is a sectional view, like Fig. 1, showing a modified form of the seal structure.
Figure 5:
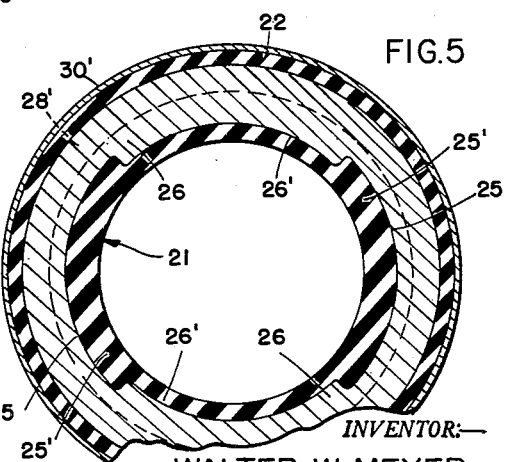
Fig. 5 is a sectional view taken substantially along the line 5—5 in Fig. 4.

In the embodiment shown in Figs. 1–3, as well as in the embodiment illustrated in Figs. 4 and 5, the seal ring extends at the open side of the trough-like gasket 20, whereby the ring and gasket form an enclosure within which is mounted a ring thrusting compression spring 31 of helico-spiral configuration, said spring bearing at one end upon an annular spring seat 32 formed on the inner gasket wall 21 at its junction with the connection portion 23, in position facing toward the opposite or open side of the gasket. The spring extends between the seat 32 and the seal ring 18, in order to apply the thrust of the compression spring upon the seal ring to urge it axially with respect to the wall portion 21 and hence with respect to a shaft on which said wall portion is mounted, in a direction away from the seat 32 and hence in the direction of the seat forming element 15. To this end, as shown more particularly in Figs. 1–3, the spring 31 may bear directly upon the seal ring 18 at the outer peripheral edge thereof immediately inwardly of the gasket wall portion 22. In the embodiment illustrated in Figs. 4 and 5, however, the spring 31′ may bear upon the gasket flange 28′, which overlies the peripheral edge of the seal ring 18, whereby said flange 28′ forms a spring seat facing axially toward the spring seat 32.

In order to protect the gasket material at the spring seat 32, an annular seating ring 33, preferably formed of sheet metal, and sized to engage upon the seat 32, may be provided for seatingly receiving the spring 31; and a similar spring seating member may be provided for application within the outer wall 22 at the inwardly extending spring seat forming flange 28′, as shown more particularly in Fig. 4 of the drawings.

It will be seen from the foregoing that the seal assembly of the present invention provides an entirely self-contained unit in which the ring thrusting spring 31 is entirely enclosed and concealed within a housing or container comprising the trough-shaped gasket 20 and the seal ring 18 assembled as a closure for the spring enclosing housing provided by the gasket. As a consequence of the foregoing arrangement, the assembly may be packaged for sale as a unit adapted for application in operating position merely by applying the unit on the shaft to be sealed, and axially sliding the same to the desired position on the shaft.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

A shaft seal comprising the combination, with a seal ring adapted to encircle the shaft and having an annular seal surface for engaging and forming a running seal with a cooperating annular seal seat, of a gasket for sealing the ring to the shaft and having sleeve-like inner and outer walls concentric with respect to a common axis, and a flexible circumferentially extending curved gasket portion integrally interconnecting said walls, at one end of the gasket, said curved portion subtending one hundred eighty degrees of curvature between the wall connected ends thereof, to thereby form the same as an annular trough-like receptacle providing an annular opening between said walls for receiving the seal ring therebetween at the end of the gasket remote from said flexible gasket portion, said inner wall being formed with a pair of oppositely facing, substantially flat, circular seats, lying in spaced parallel planes normal to said axis, including an outwardly facing seat, disposed at said one end of the gasket, in position to engage a corresponding abutment shoulder, on the shaft, at the junction of said flexible gasket portion with said inner wall, and an inwardly facing spring seat, disposed inwardly of said flexible gasket portion, in position facing said ring receiving annular opening, to thereby leave said flexible portion free for flexing movement throughout the entire extent of its curvature, and a compression spring enclosed within said trough-like receptacle, behind said ring, in position thrusting in opposite directions upon said ring and spring seat.

References Cited in the file of this patent

UNITED STATES PATENTS

| | | |
|---|---|---|
| 2,379,868 | Curtis | July 10, 1945 |
| 2,599,034 | Wilkinson | June 3, 1952 |
| 2,610,075 | Haake | Sept. 9, 1952 |
| 2,650,841 | Meyer | Sept. 1, 1953 |

FOREIGN PATENTS

| | | |
|---|---|---|
| 631,981 | Great Britain | Nov. 14, 1949 |
| 648,814 | Great Britain | Jan. 10, 1951 |